United States Patent [19]

Schriwer

[11] Patent Number: 4,634,297
[45] Date of Patent: Jan. 6, 1987

[54] MEANS FOR SEALING OF A BEARING SPACE FORMED IN HYDROSTATIC AND AEROSTATIC BEARINGS ADAPTED TO RECEIVE A FLUID

[76] Inventor: Sven Schriwer, Trädgårdsvägen 36, 461 42 Trollhättan, Sweden

[21] Appl. No.: 743,276
[22] PCT Filed: Apr. 8, 1982
[86] PCT No.: PCT/SE82/00116
§ 371 Date: Dec. 14, 1982
§ 102(e) Date: Dec. 14, 1982
[87] PCT Pub. No.: WO82/03666
PCT Pub. Date: Oct. 28, 1982

Related U.S. Application Data

[63] Continuation of Ser. No. 453,884, Dec. 14, 1982, abandoned.

[30] Foreign Application Priority Data

Apr. 15, 1981 [SE] Sweden .................................. 8102435

[51] Int. Cl.⁴ ......................... F16C 32/06; F16C 33/72
[52] U.S. Cl. ..................................... 384/100; 384/119; 384/147
[58] Field of Search ................. 384/99, 100, 119, 124, 384/121, 147; 277/3, 96, 96.1, DIG. 5

[56] References Cited

U.S. PATENT DOCUMENTS

| | | | |
|---|---|---|---|
| 3,824,662 | 7/1974 | Minegishi | 277/96 X |
| 4,058,321 | 11/1977 | Gavrun et al. | 277/46 X |
| 4,076,335 | 2/1978 | Ahmed et al. | 384/100 X |
| 4,114,959 | 9/1978 | Christ | 384/100 X |
| 4,404,724 | 9/1983 | Christ et al. | 384/100 X |

FOREIGN PATENT DOCUMENTS

| | | | |
|---|---|---|---|
| 1155644 | 10/1963 | Fed. Rep. of Germany | 277/96.1 |
| 1382268 | 11/1964 | France | 384/119 |

Primary Examiner—Stuart S. Levy
Assistant Examiner—Thomas R. Hannon

[57] ABSTRACT

A seal for a bearing space in hydrostatic or aerostatical bearings. It is of ring-shaped extension supported by a first bearing body so that with its sealing contact surface it bears in linear manner against a second bearing body forming part of the bearing. A plane which along the entire periphery of the ring extends through its sealing contact surface occupies an angular position relative to the symmetry axis of the bearing body, which the ring surrounds or against which it bears, and/or the plane crosses the perpendicular to a preferably concentric bearing surface of the second body.

5 Claims, 32 Drawing Figures

MEANS FOR SEALING OF A BEARING SPACE FORMED IN HYDROSTATIC AND AEROSTATIC BEARINGS ADAPTED TO RECEIVE A FLUID

This application is a continuation of application Ser. No. 453,884, filed Dec. 14, 1982 now abandoned.

The present invention relates to a method for the sealing of a bearing space formed in hydrostatic and aerostatical bearings and adapted to receive a fluid, and a means to carry out said method.

It is a principal object of the invention to provide a method and a means of the kind mentioned above, which makes it possible to produce a resulting force operating on the bearing in a determined direction. By such a method the need to use expensive roller bearings, for example in axial reciprocating engines, is reduced. It is also desirable to make it possible to combine bearings of different types with hydrostatic or aerostatical bearings, which results in bearing units of small size with a carefully defined position for the detail mounted in the bearing at the same time as a long service life is obtained in connection with high rotation speed and working thrust. It is also desired to keep the flow of oil or any other fluid on a low level.

Said object is obtained by means of a method according to the present invention, which is substantially characterized by a seal of ring shape being supported by a first bearing body in such a manner that with its sealing contact surface it bears in a linear manner against a second bearing body forming part of the bearing, a plane extending around the whole periphery of the ring through its sealing contact surface occupying an angular position relative to the symmetry axis of the bearing body that the ring surrounds or bears against and/or said plane crossing the perpendicular of a preferably concentric bearing surface arranged at the other body.

A means made according to the invention is further characterized by a seal of ring shape being received in and supported by a first bearing body forming part of the bearing, the sealing contact surface of the seal being linearly fitted to a bearing surface, which is provided on a second bearing body forming part of the bearing, so that a plane extending through the sealing contact surface of the ring along the entire periphery of the same occupies an angular position relative to the symmetry axis of the bearing body, which the ring surrounds or to which it can be fitted and/or an arrangement, in which said plane is disposed to cross the perpendicular of a preferably concentric bearing surface provided at the second body.

The invention is described in the following, reference being made to the accompanying drawings, in which FIG. 5 is a schematical cross-sectional view of a hydrostatic bearing, the sealing ring of which bears against a plane bearing surface, FIG. 6 shows a bearing similar to the one shown in FIG. 5, but with the sealing ring bearing against a concave bearing surface, FIG. 7 likewise shows a bearing similar to the one shown in FIG. 5, but with the sealing ring bearing against a convex bearing surface, the sealing ring being shown as seen in the direction of the force, FIG. 8 shows the invention applied to a piston made of a hollow work piece, FIG. 9 shows the invention applied to a rotating piston.

The invention, which is described below and which is shown in the drawings, relates to bearings, which are of the hydrostatic or aerostatical type, but these bearings are for simplicity's sake in the following part of the description denominated hydrostatic bearings only.

Figure 1:
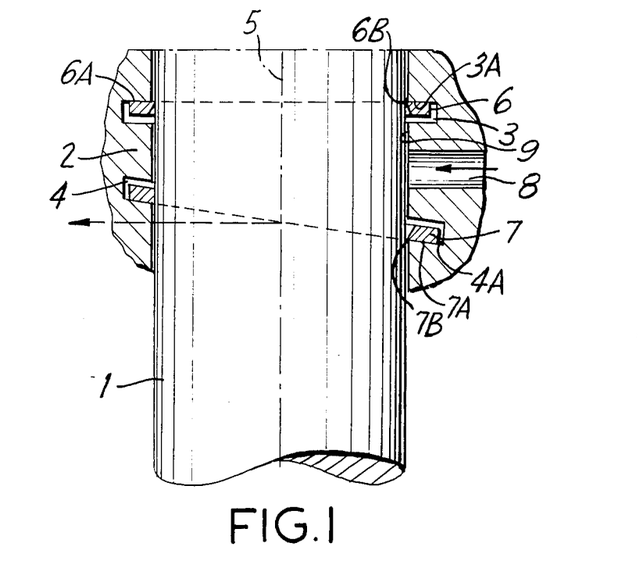
FIG. 1 shows a hydrostatic axial bearing.

A vertically directed bearing shaft 1, shown in FIG. 1 and fitted in a bearing housing 2 adapted to the form of the shaft and supporting a load not shown in the drawing, forms "a second" bearing body forming part of the bearing, while the bearing housing 2 forms "a first" bearing body. Two ring-shaped recesses 3 and 4 respectively are provided in said bearing housing 2, of which one recess 3 extends at a right angle relative to the central axis 5 of said bearing shaft 1 and bearing housing 2. The other ring-shaped groove 4 occupies an angular position relative to said central axis 5. A sealing ring 6 and 7 respectively adapted to the recess 3, 4 is received each one in its recess of said two recesses, and one side 6A and 7A respectively of said sealing ring can be fitted in bearing contact to an appropriate side 3A and 4A respectively of the grooves 3 and 4 respectively. The rings 6, 7, which preferably comprise split-up or solid resilient metal rings of by way of example high-speed steel, hard metal, compound material etc. exhibit a preferably inclined sealing contact surface 6B and 7B respectively on its inner envelope surface. Said two sealing contact surfaces 6B and 7B respectively bear along the periphery of the shaft 1 with their inwards facing contact surface ends.

A pressurized liquid is supplied to a space 9 formed between the two sealing rings 6, 7 via a duct 8 leading to said space 9. The rotation of the shaft 1 relative to the bearing housing 2 and the pressurized liquid of the bearing space 9 produce a resulting pressure force working on the bearing in a determined direction, said force in the drawing in FIG. 1 being indicated with an arrow departing from the center 5 of the shaft 1. This component force can counteract other forces operating on the bearing and substantially reduce or change primary forces acting upon the same and thereby make it possible for example to combine a hydrostatic bearing with other types of bearings and also makes it possible to work with great pressure gradients on the bearing and with great sliding speed. The wear of the bearing body, against which the seals 6, 7 bear with their bearing surfaces 6B, 7B, is also not very great, as only a linear contact takes place between the ring 6, 7 and the bearing surface 1.

The peripheral shape of the oblique ring 7 with the groove 4 belonging thereto is of oval form, so that the ring shall be able to bear with its sealing contact surface 7B in a close fit to the peripheral surface of the shaft 1. The other ring 6 with the groove 3 belonging thereto is substantially of circular shape.

Figure 2:
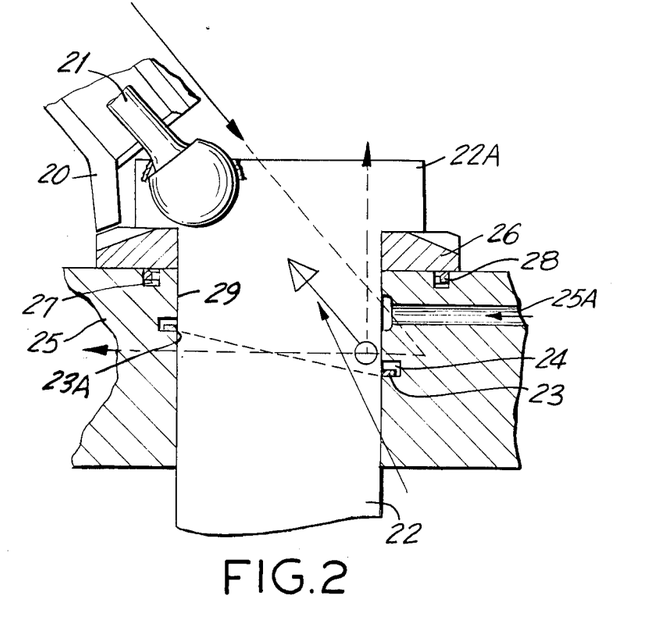
FIG. 2 shows a hydrostatic shaft bearing in combination with an axial bearing as applied in an hydraulic machine with spherical pistons.

In the bearing shown in FIG. 2 it is intended to apply a hydrostatic axial bearing to an hydraulic machine 20 with spherical pistons 21. It is of course not necessary that the pistons are spherical, as the principle also can be applied to pistons which are cylindrical and provided with articulated piston rods. In a similar manner to the arrangement in the bearing shown in FIG. 1, the pivot 22 along its periphery is in linear engagement with the sealing contact surface 23A of a sealing ring 23 of suitable form supported in a groove 24 in a bearing housing 25. On the underside of a gear unit in the form of a gear ring 26 forming part of the hydraulic machine 20, on which gear ring 26 a flange 22A fastened to the upper end of the shaft 22 is bearing, a circular groove 27 is made in the bearing housing 25, in which groove 27 an in upwards direction spring biassed sealing ring 28 is supported until reaching linear contact against the underside of the ring gear 26. A hydraulic liquid under pressure is intended to be fed to a space 29, which is formed between said two sealing rings 23, 28 via the passage 25A of the bearing housing 25.

The component force produced is in FIG. 2 of the drawing indicated with an unfilled arrow, and, as is evident from the FIG. 2, this component force is directed against the forces, which the pistons 24 exercise upon the bearing. Thus, it is made possible to mount the shaft 22 entirely without any roller bearings thanks to the present invention.

Figure 3:
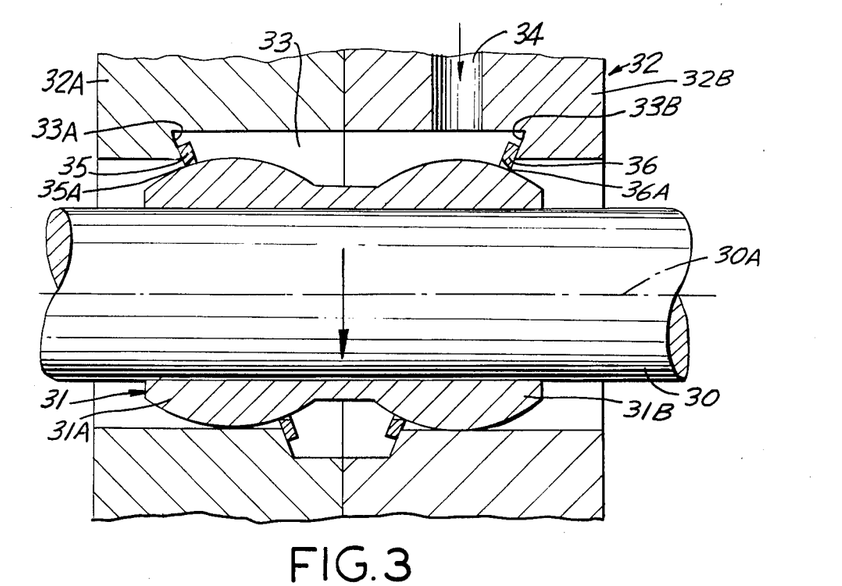
FIG. 3 shows a hydrostatic radial bearing with a possibility to change the force operating on the bearing.

A horizontally journalled shaft 30 exhibiting a rotatably journalled bearing surface formed by a sleeve 31 with two convex spherical bearing surfaces 31A and 31B respectively located at a certain distance from each other and supported on the shaft 30 is shown in FIG. 3. A bearing housing 32 formed by two bearing housing parts 32A and 32B respectively, which can pivot relative to each other, in assembled condition of the two housing parts 32A, 32B exhibits a chamber 33 adapted to receive a fluid, into which chamber a duct 34 empties, through which a fluid can be supplied to the chamber 33. An endwall 33A and 33B respectively is provided at both respective ends of the chamber 33, against which endwall a sealing ring 35 and 36 respectively can bear with one of its sides 35A and 36A respectively. Said endwalls 33A and 33B respectively are arranged in such a manner that they occupy an angular position, then preferably an oblique position, relative to the symmetry axis 30A for the shaft 30 and to the bearing sleeve 31. The two sealing rings 35, 36 with a linear contact surface bear against the periphery of the respective spherical bearing surfaces 31A and 31B respectively. By pivoting the two bearing housing parts 32A and 32B respectively relative to each other, the resulting force operating on the bearing can be varied with respect to its direction as well as to its magnitude, when the pressure of the fluid is constant. A pivoting of the two housing parts 32A, 32B together as a single unit does only change the direction of the resulting force operating on the bearing. In FIG. 3 the resulting force is shown as an unfilled arrow.

It is also possible to journal the rings in a similar chamber but located on the shaft instead of in the bearing housing. Oil etc. is then supplied via a passage in the shaft.

Figure 4:
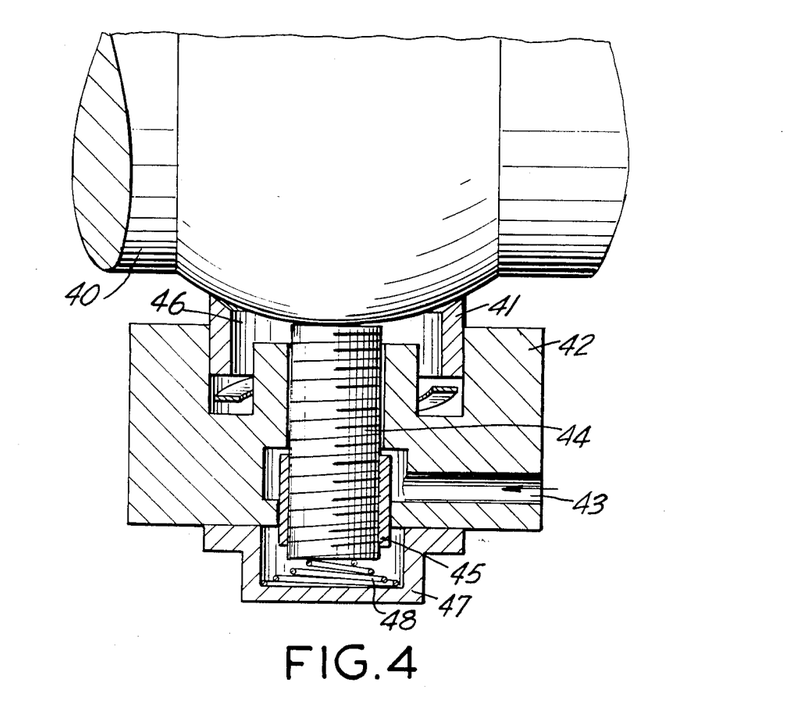
FIG. 4 shows a self-aligning bearing construction for a hydrostatic bearing.

FIG. 4 shows how the invention can be utilized in order to support a radially loaded rotating shaft 40. A conceivable design of a self aligning bearing construction for a hydrostatic bearing with spring biassed sealing rings 41 working with linear sealing is shown here. A number of bearing units 42 are placed in planetary arrangement round the shaft 40 and are each one via a passage 43 connected with the same source of pressure in order to provide a balancing pressure. The illustrated indication bolt 44 with its adjusting nut 45 continuously senses the position of the shaft 40 relative to the bearing body 42 and increases the area of the flow intake for the balancing pressure, if the shaft 40 approaches the bearing body 42. The oil pressure then increases in the pocket 46 inside of the sealing ring 41 and the shaft 40 is lifted until a balance is reached between the load on the shaft 40 and the oil pressure inside of the sealing ring 41.

A lid 47 housing a spring 48, which presses the bolt 44 against the shaft 40, is detachable in order to make possible the adjustment of the nut 45 along the bolt 44.

By means of the illustrated principle it is possible with great precision to determine the center of rotation of the shaft 40 and keep the same within very narrow limits of variation also in connection with great variations of the load. It is also possible to apply self-aligning bearing constructions of the kind mentioned above to such bearings, where a rotating disc instead comprises the bearing surface and a number of bearing bodies with sealing rings operate against the disc, such as, thrust bearings, for example propeller-thrust bearings, thrust bearings of turbine engines, or similar.

Figures 5, 6, 7, 8, 9:
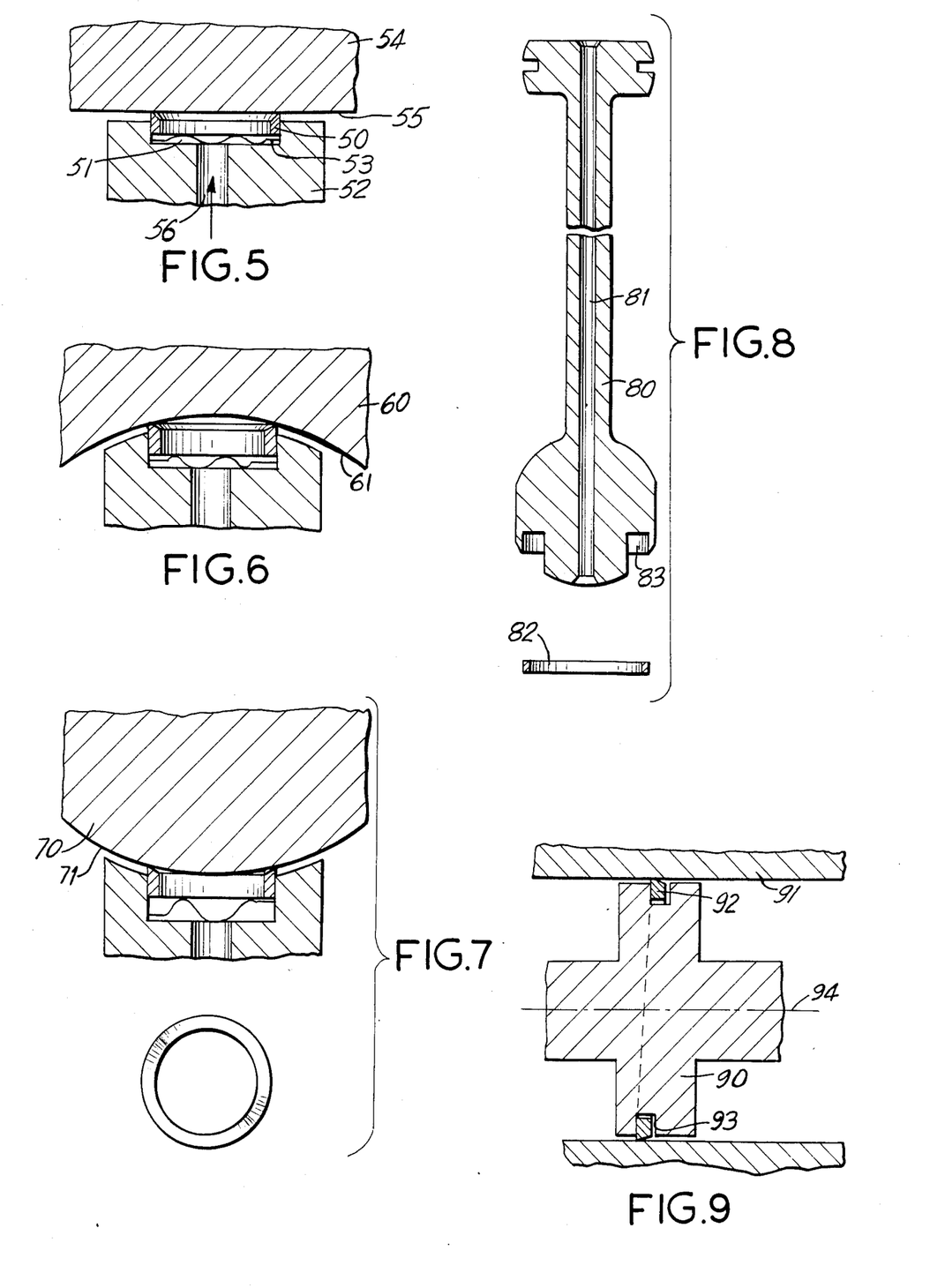

A sealing ring 50 placed in a recess 51, which is provided in a bearing, such as a fixed bearing housing 52 is shown in FIG. 5. By means of a spring 53 located between the housing 52 and the ring 50, the ring 50 can be springingly pressed against a movable loaded body 54 with a substantially plane bearing surface 55. Oil can be supplied to the bearing via a passage 56 in the bearing housing 52, which passage enters at the center of the ring in the recess 51. Also this ring 50 as well as all other rings shown in the other drawings in the present patent application bear with a linear sealing contact surface against the bearing surface belonging thereto.

A similar bearing construction as the one shown in FIG. 5 is illustrated in FIGS. 6 and 7, but with the difference that the bearing surface of the movably loaded body 60 and 70 respectively is designed with a concave and convex bearing surface 61 and 71 respectively.

Figures 21A, 21B, 21C, 21D, 22A, 22B:
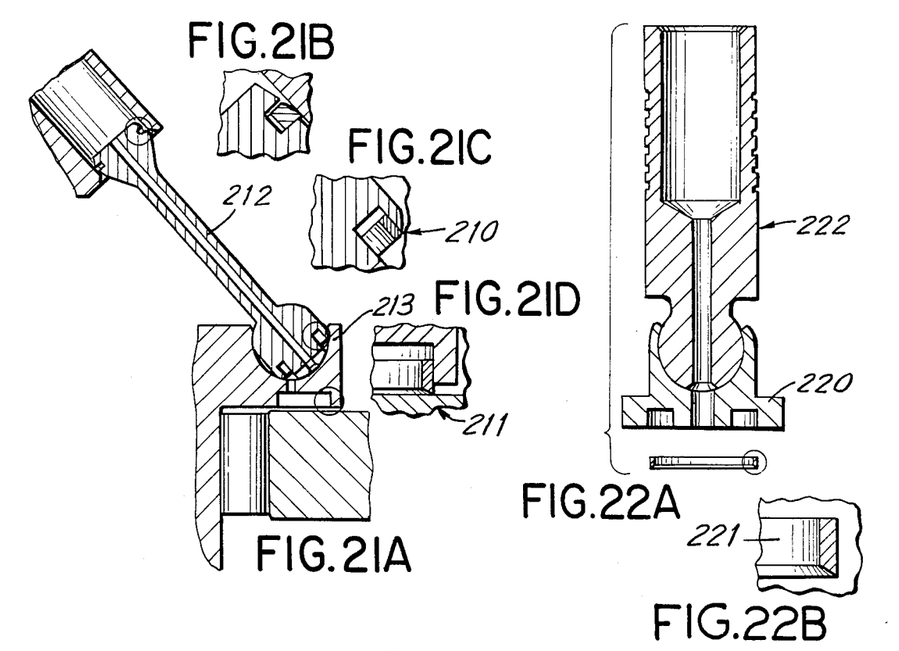
FIG. 21 is a detailed view of the arrangement of the sealing ring in such a hydraulic pump/motor as the one shown in FIG. 20.
FIG. 22 shows a sealing ring supported on a cylindric piston, which is provided with a sliding ferrule.

In FIG. 8 is shown how one end of a piston 80, which along its central axis has an oil supply duct 81, is arranged with a recess 83 adapted to the form of a sealing ring 82, so that said ring can bear against a bearing surface in the manner shown in FIG. 21 and form a hydrostatic bearing.

A rotating piston 90, which is movably mounted in a bearing body 91 with a cylinder space adapted to the piston 90, supports a sealing ring 92 in a recess 93 of the piston 90, as is shown in FIG. 9. Said ring 92 occupies an angular position relative to the symmetry axis 94 of the piston 90.

Figure 10:
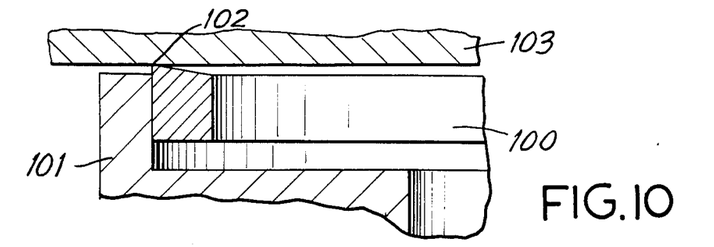
FIGS. 10, 11, 12 show the linear sealing contact bearing of the sealing ring against a movable bearing body with a plane bearing surface, a concave spherical bearing surface, and a convex spherical bearing surface respectively.
Figure 11:
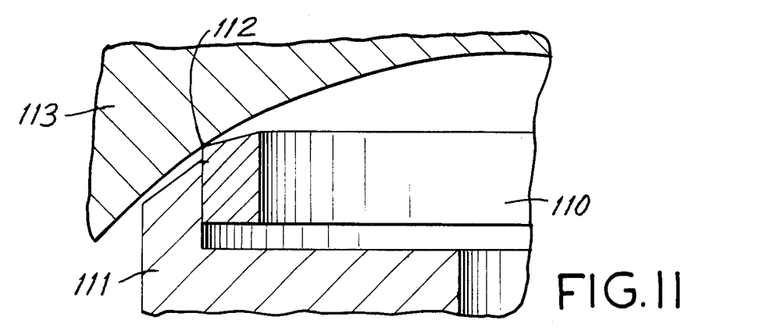
Figure 12:
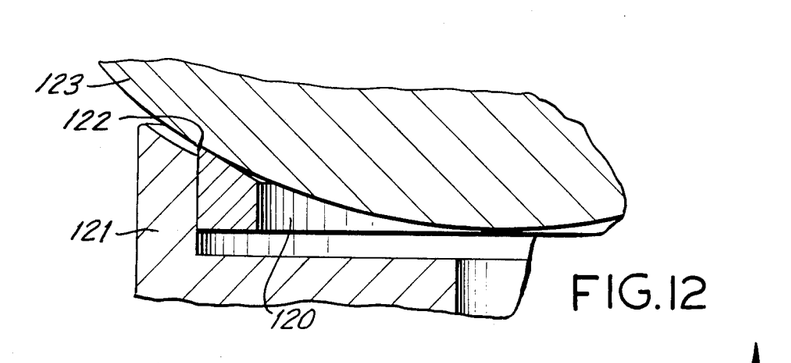

Sealing rings 100, 110 and 120 respectively, which are supported each one by its bearing body 101, 111 and 121 respectively with linear bearing with its sealing surface 102, 112 and 122 respectively against a bearing surface 103, 113 and 123 respectively belonging thereto, are shown in FIGS. 10–12. The angle between a perpendicular to the bearing surface 103, 113, 123 and the top surface of the ring 100, 110, 120 is then greater than or equal to 90°.

Figure 13:
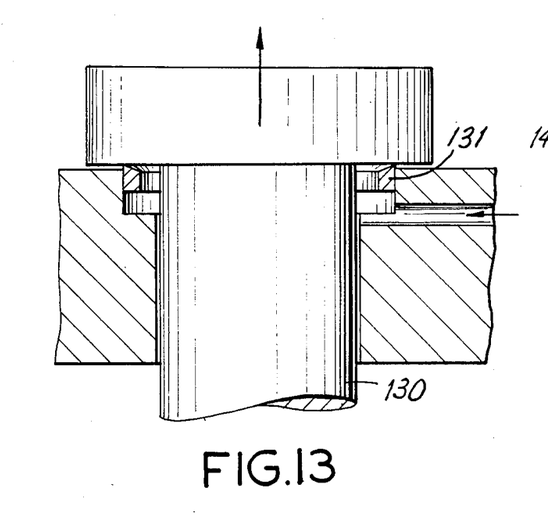
FIG. 13 shows the invention applied to a rotating vertically directed shaft provided with a flange and with the sealing ring concentrically supported on the shaft.
Figure 14:
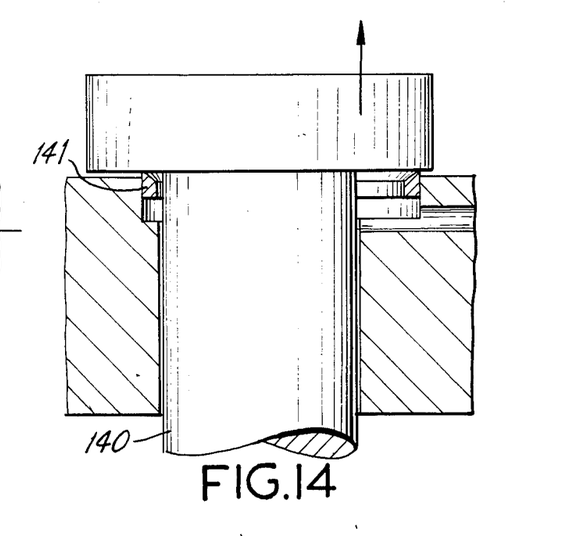
FIG. 14 shows the same bearing arrangement as the one shown in FIG. 13, but with the sealing ring supported in an eccentric manner on the shaft.

FIGS. 13 and 14 show how the bearing principle can be utilized in order to provide an axial force operating on a rotating shaft 130 and 140 respectively provided with a flange. A sealing ring 131 is in the first case shown in concentric position around the shaft 130, the resulting force shown by means of an arrow in FIG. 13 of the drawing operating at the center of the shaft. In the second case, viz. the one shown in FIG. 14, the sealing ring 141 is placed in an eccentric position relative to the shaft 140, the resulting force being displaced in parallel to the sidewise direction of the shaft.

Figure 15:
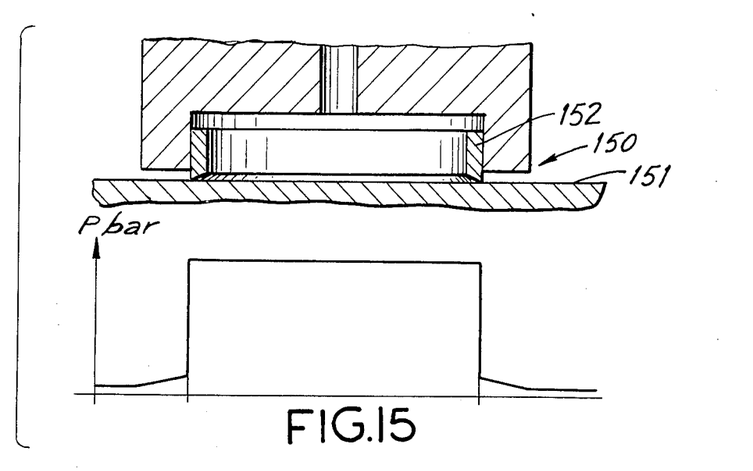
FIG. 15 shows the distribution of pressure in a hydrostatic bearing, the sealing ring of which bears against a plane bearing surface.
Figure 16:
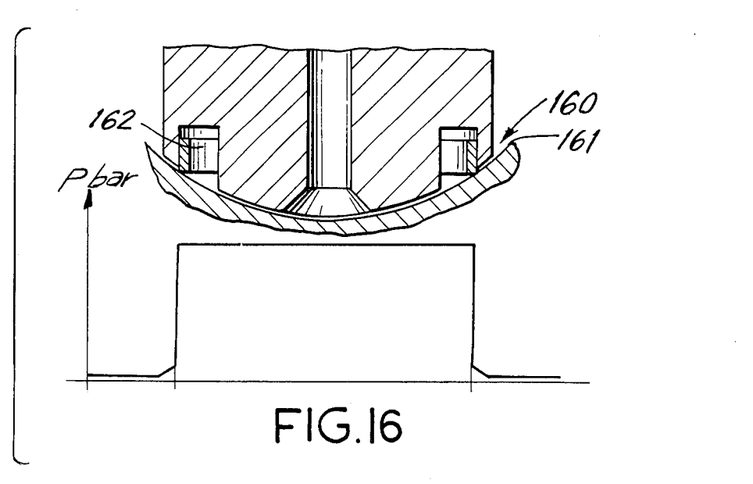
FIG. 16 shows the distribution of pressure in a hydrostatic bearing, the sealing ring of which bears against a concave spherical bearing surface.

The distribution of pressure in two bearings 150 and 160 respectively, in which the sealing ring 152 and 162 respectively can be brought into contact with a plane or a curved bearing surface 151 and 161 respectively, as seen along the diameter of the rings 152 and 162 respectively, is shown in FIGS. 15 and 16.

Figure 17:
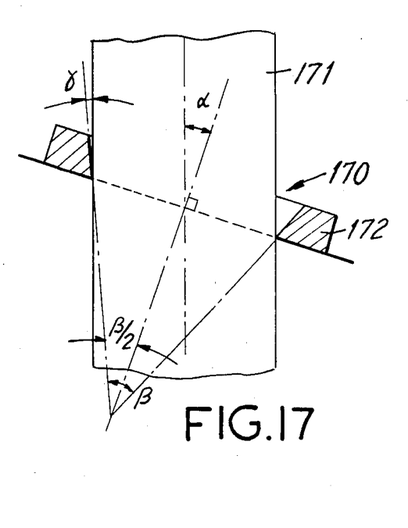
FIG. 17 is a schematical view showing the angular relation in a sealing ring that bears against a shaft.
Figure 18:
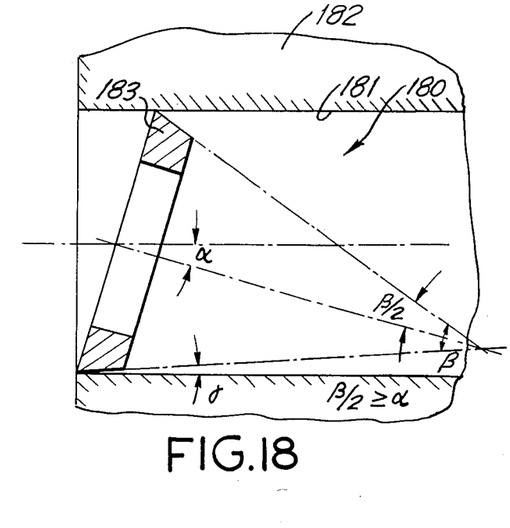
FIG. 18 is a schematical view showing the angular relation in a sealing ring, which co-operates with an interior cavity.

Two bearings 170 and 180 respectively are schematically shown in FIGS. 17 and 18 respectively, of which bearings one shows a sealing ring 172, which can co-operate with the outside of a shaft 171, and the other shows a sealing ring 183 co-operating with the inner envelope surface 181 of a bearing housing 182. Suitable angular conditions are in this connection indicated in the drawings, the rule being valid that the angle $\gamma$ has to be greater than 0 degrees in order to bring about a linear bearing between the sealing ring and its respective bearing surface, with which it can co-operate.

Figure 19:
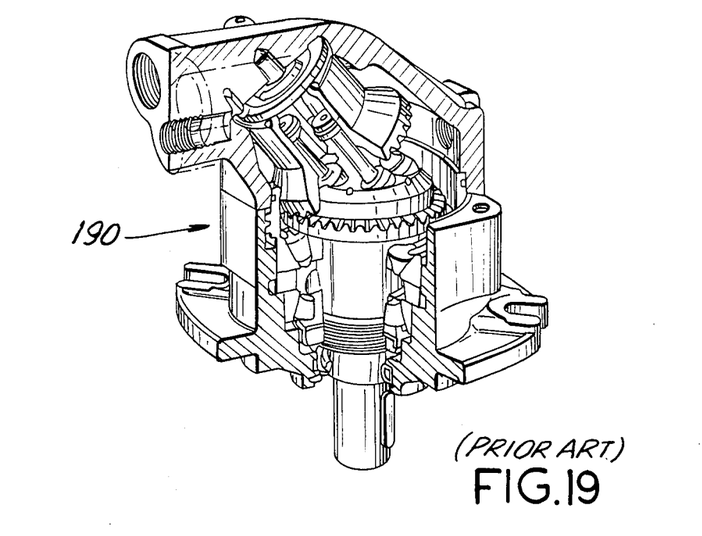
FIG. 19 is a cross-sectional view of a known conventional hydraulic pump/motor provided with a roller bearing.

A cross-section through the motor of an hydraulic pump 190, in which the bearing comprises roller bearings, is shown in FIG. 19.

Figure 20:
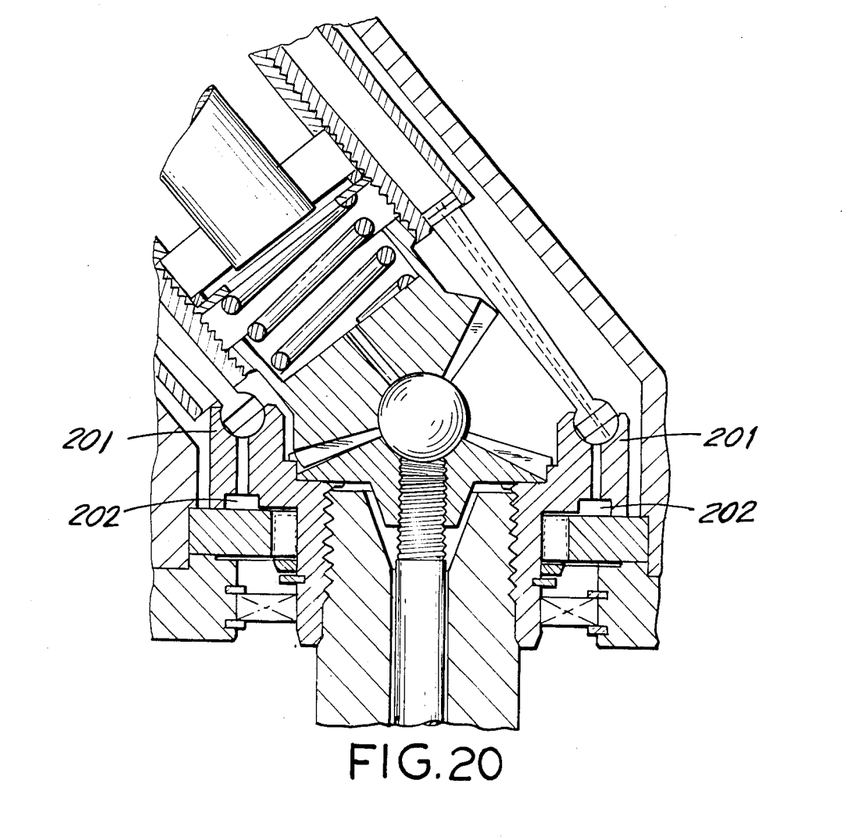
FIG. 20 shows the invention applied to a hydraulic pump/motor.

In FIG. 20 it is shown how the bearing in a motor similar to the one shown in FIG. 19 has been partly substituted by hydrostatic bearings 201 and 202 respectively of the kind related to the invention.

The bearings 210 and 211 respectively at the piston 212 and the pivot flange 213 respectively of such a motor are shown in FIG. 21 on an enlarged scale.

A piston 222 provided with a sliding ferrule 220 and a sealing ring 221 is shown in FIG. 22.

Figure 23:
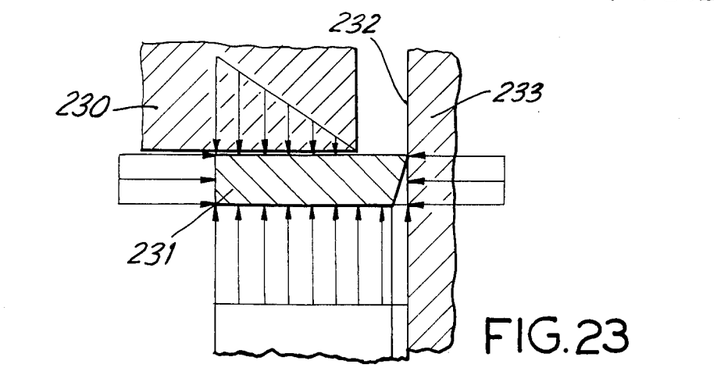
FIG. 23 shows the distribution of force for a sealing ring arranged according to the invention.

The balance of forces in connection with a sealing ring 231 made according to the invention is shown in FIG. 23, where said ring 231 is supported by a bearing body 230 and bears against the bearing surface 232 of a second bearing body 233.

Figure 24:
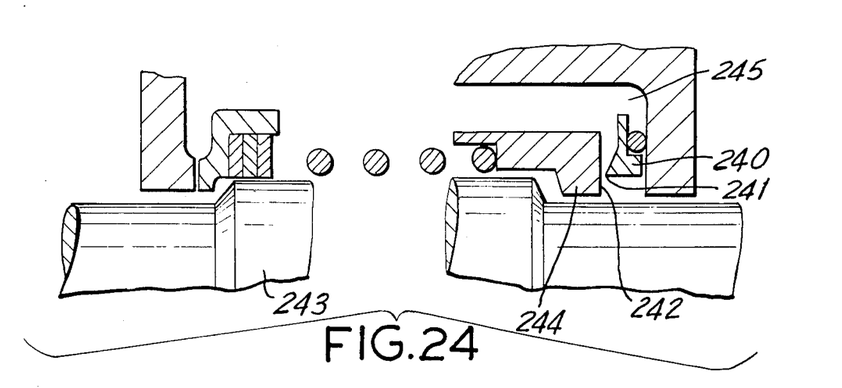
FIG. 24 shows a shaft seal.

In FIG. 24 a sealing ring 240 of a somewhat different cross-section than the other rings shown bears with its sealing contact surface 241 in linear manner against the bearing surface 242 of a bearing part 244 supported on a shaft 243 and seals between the bearing space 245 and the surrounding air.

Figure 25:
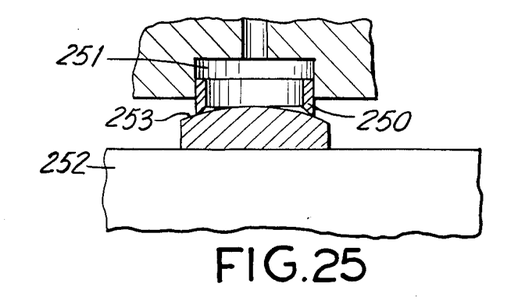
FIG. 25 shows the invention applied to a carrying fixed bearing pocket provided with a seal and cooperating with a movable loaded bearing body, which supports a convex spherical bearing surface.

In FIG. 25 of the drawings it is shown how the invention is applied to a carrying fixed bearing pocket 251 provided with a seal 250 and co-operating with a movable loaded bearing body 252, which supports a convex spherical bearing surface 253.

In the embodiments according to the FIGS. 26–29 it is shown, how two or more sealing rings can be placed inside each other, by way of example in a concentric arrangement with the purpose to improve the sealing effect for the bearing.

Figure 26:
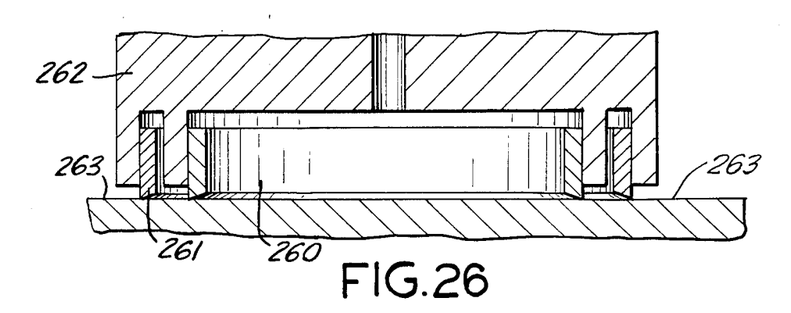
FIGS. 26–28 show additional examples of embodiment of hydrostatic bearings made according to the invention with two sealing rings, one of them being placed inside the other ring.

In FIG. 26 it is shown how two sealing rings 260 and 261 respectively, which are concentrically disposed, are supported by a bearing body 262 for bearing against a bearing surface 263.

Figure 27:
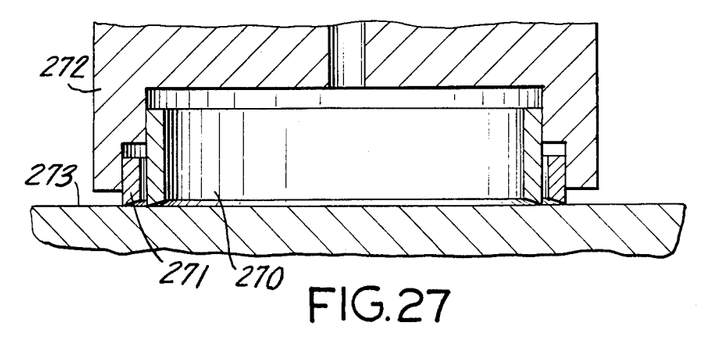

An alternative arrangement of rings comprising two sealing rings 270 and 271 respectively is shown in FIG. 27, said rings being of different height and supported by a common bearing body 272, and intended to bear against a bearing surface 273. This arrangement requires less space than the previously shown arrangement.

Figure 28:
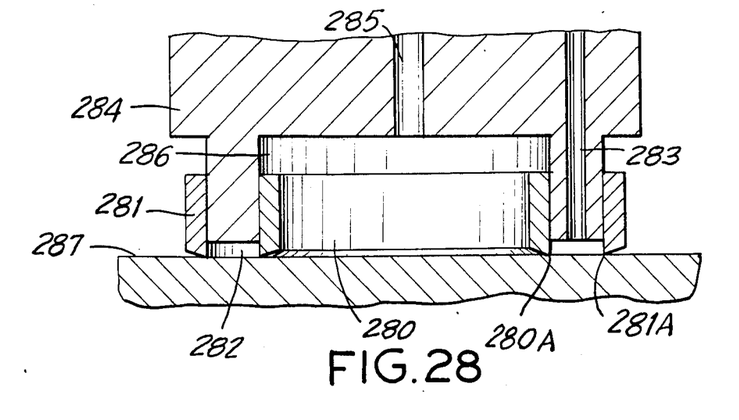

An additional arrangement with two sealing rings 280 and 281 respectively is shown in FIG. 28, where the inner ring 280 has its line-sealing edge 280A at its outer diameter, and the outer sealing ring 281 has its sealing linear edge 281A at its inner diameter. The ring-shaped space 282 between the two rings 280 and 281 is by means of a duct 283 in communication with the top side of the bearing body 284. The duct 283 can be utilized in order to regulate the pressure between the rings 280 and 281. A duct 285 also leads to the space 286, in which the inner ring 280 is received and supported. The two rings 280 and 281 respectively bear with both their edges 280A and 281A respectively against a bearing surface 287.

Figure 29:
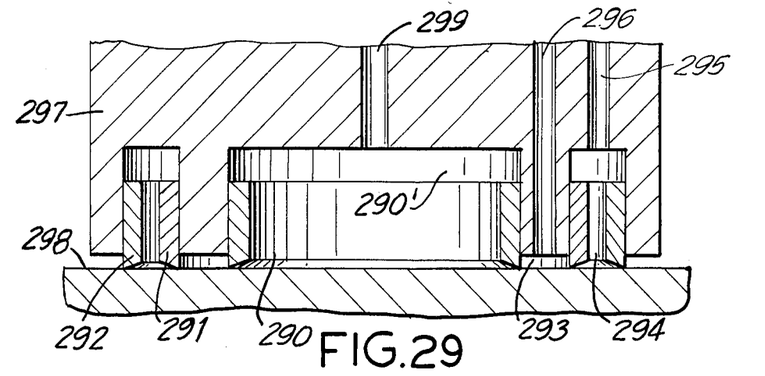
FIG. 29 shows a bearing with three sealing rings inside each other.

An arrangement with three sealing rings 290, 291, 292 is shown in FIG. 29. Here there are two ringshaped spaces 293 and 294 respectively between the sealing rings 290, 291 and 291, 292 respectively, and each space is provided with a duct 295 and 296 respectively, which extends through a bearing body 297. An additional duct 299 is arranged to communicate with a space $290^1$, in which the inner ring 290 is received and supported, with the outer portion of the bearing body 297. Said ducts 295, 296 and 299 can be utilized for an individual regulation and/or indication of the pressures in the two ringshaped spaces 293 and 294 and the space 290¹, in which the inner ring 290 is received and supported. All sealing rings are arranged in order to bear against a preferably common bearing surface 298.

Figure 30:
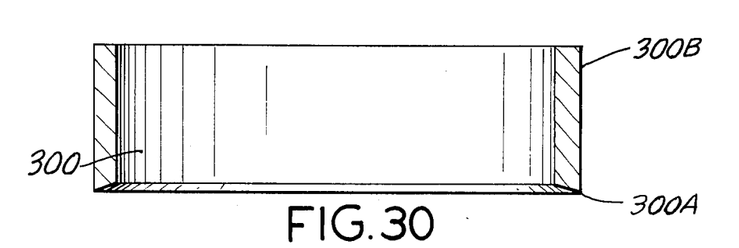
FIGS. 30–32 show different embodiments concerning the linesealing edge of the respective sealing rings.

A sealing ring 300 with its line sealing edge 300A at its outer diameter 300B is shown in FIG. 30. The cylindrical outer diameter 300B of this ring must closely fit to a corresponding recess in the bearing body. Such an illustrated ring 300 is axially counter-balanced.

Figure 31:
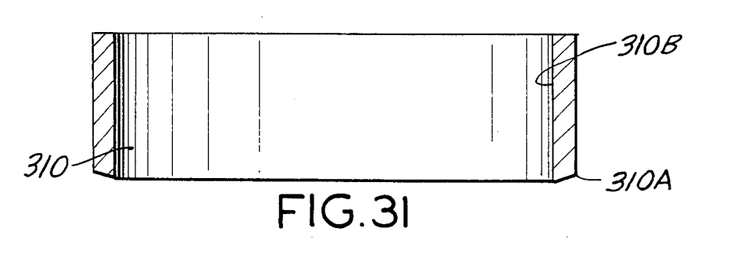

An additional sealing ring 310 is shown in FIG. 31, said ring having its line sealing edge 310A at its inner diameter 310B. The cylindrical inner diameter 310B of the ring 310 must closely fit to a corresponding surface of the bearing body. Also such an illustrated ring 310 is axially counterbalanced.

Figure 32A:
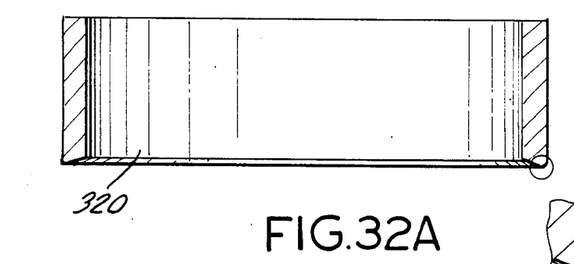
Figure 32B:
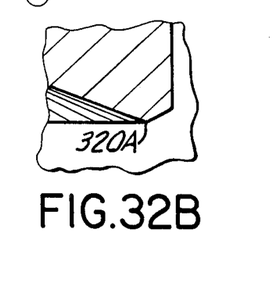

A sealing ring 320 is finally shown in FIG. 32, where the line sealing edge 320A is somewhat retracted. This ring 320 is therefore not completely axially counter-balanced. A sealing ring 310 according to FIG. 31 can in a corresponding manner be designed with its line sealing edge disposed with a somewhat greater diametrical measure than what corresponds to its inner diameter. Neither this ring will then be completely axially counter-balanced.

The function of the invention should be evident from what has been described above and in the accompanying drawings. It is obvious that the idea of the invention signifies that a resulting force operating in a determined direction shall be provided by means of a sealing ring. This force is proportional to the existing oil pressure and the obliqueness and shaft diameter of the ring.

In addition to the previously mentioned advantages, which can be obtained by means of the invention, it may also be mentioned that the bearing will not be so sensitive to impurities, among other things on account of any narrow passages, which can be clogged by such possible impurities, not being required in such a bearing as is related to the present invention. The mechanical efficiency is moreover better for a bearing as per the above description than for a conventional bearing especially in connection with high revolutions and loads, and on account of the narrow sealing surface of the sealing ring the bearing can in addition obtain a good cooling and work safely with a full load from a standstill up to the highest possible sliding speed.

The invention is not limited to the embodiments illustrated in the drawings and described above, but can be varied within the scope of the following claims.

I claim:

1. A hydrostatic or aerostatic bearing comprising: a first stationary bearing body, a second bearing body having a bearing surface slidable relative to said first bearing body, a space between said two bearing bodies containing a fluid, an annular seal in said stationary bearing body for sealing said space, said annular seal being movable towards and away from said bearing surface, said annular seal having a first end face remote from said bearing surface, and a second end face facing said second bearing body, said second end face having a linear annular edge, and a spring in said first bearing body and engaging said first end face, said spring pressing said end face into sealing line contact with said bearing surface along said annular edge only, to thereby seal said space.

2. A bearing according to claim 1, wherein said first bearing body has a chamber receiving said seal and said spring, said chamber conforming to the shape of the seal.

3. A bearing according to claim 2, wherein said annular seal has an enveloping surface bearing against and guided by a surface of said chamber co-operating with said enveloping surface.

4. A bearing according to claim 2, wherein said chamber is of circular shape, and said second bearing body is a shaft.

5. A bearing according to claim 2, wherein said chamber is of circular shape, said second bearing body is a disc-like body.

* * * * *